July 10, 1951 R. E. SHARP 2,560,253
PISTON FOR INTERNAL-COMBUSTION ENGINES
Filed Feb. 6, 1950

INVENTOR.
Robert E. Sharp
BY Hamilton + Hamilton
Attorneys.

Patented July 10, 1951

2,560,253

UNITED STATES PATENT OFFICE 2,560,253

PISTON FOR INTERNAL-COMBUSTION ENGINES

Robert E. Sharp, Kansas City, Mo.

Application February 6, 1950, Serial No. 142,668

7 Claims. (Cl. 309—7)

This invention relates to new and useful improvements in pistons for internal combustion engines, and relates particularly to the mounting of piston rings in said pistons.

Pistons for internal combustion engines for automobiles and the like comprise normally a substantially circular head portion and a depending circular skirt portion integral with said head. The skirt portion is slotted about a substantial portion of its periphery adjacent said head in order to reduce the transfer of heat by conduction from the head to the skirt, thereby reducing the expansion of said skirt and permitting a closer initial fit of the skirt in the cylinder. Piston rings are disposed in peripheral grooves formed in the external surface of the skirt, said rings being classified generally as compression rings and oil rings. The compression rings are generally solid and disposed in grooves having closed bottoms, and are adapted to prevent leakage of combustion products past the piston. The oil rings are generally slotted or otherwise perforated, and disposed in grooves having their bottoms vented to the interior of the piston, whereby oil removed from the cylinder walls by said oil rings will be carried to the piston interior and hence returned to the oil pan. Said oil rings are of two general types, the resilient type which are urged outwardly against the cylinder walls by their own resilience, and the spring loaded type. The latter contemplates the use of a spring placed in the ring groove and urging the ring outwardly. This type of ring is desirable for many purposes, and is used especially as a replacement in worn engines, due to its greater expansive force and consequent close contact with cylinder walls. The spring is based in the bottom portion of the groove.

At least one important manufacturer has found it expedient to form the first described heat insulating slots at the bottom of an oil ring groove adjacent the piston head, whereby said slots serve the dual purpose of reducing heat conduction and of providing for the circulation of oil. Since this removes the bottom wall of the oil ring groove around a major portion of its periphery, the spring loaded type of oil ring cannot be used in this type of piston, since there is inadequate foundation for the spring. A principal object of the present invention is therefore the provision, in a piston of the character described, of means for providing a base for the oil ring spring at the portions thereof transversing said heat insulating and oil circulating slots, without blocking or otherwise impairing the efficiency of said slots.

Another object is the provision, in a piston of the character described, of means for providing a foundation for the oil ring spring at the portions thereof traversing said heat insulating and oil circulating slots, said foundation means being floating with respect to the piston on axis transverse to the wrist pin. This provides that uneven loading of the piston by the products of combustion, and consequent forcing of the piston to one side or the other of the cylinder, will not cause the piston ring to dig into or gall the cylinder walls.

Other objects are simplicity and economy of construction, efficiency and dependability of operation, and adaptability to be used either as new equipment or to be installed as an accessory in old engines.

With these objects in view, as well as other objects which will appear in the course of the specification, reference will be had to the drawing, wherein.

Figure 1:
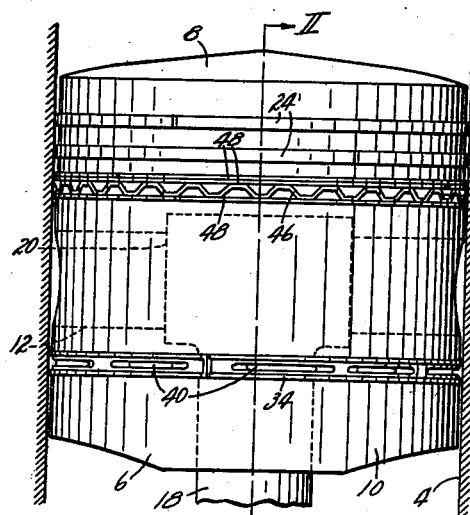
Figure 1 is a side elevation of a piston embodying the present invention in operative relation in a motor block, shown in section.
Figure 2:
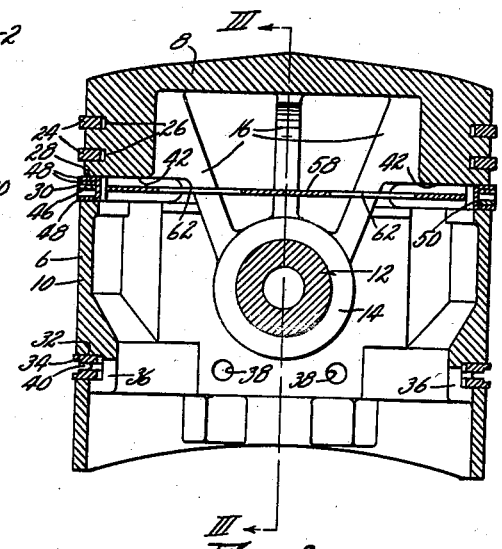
Figure 2 is a sectional view of the piston taken on line II—II of Fig. 1, with the piston rod omitted.

Like reference numerals apply to similar parts throughout the several views, and the numeral 2 applies to the block of an internal combustion engine having the usual cylindrical bore 4 formed therein. Disposed in said bore substantially coaxially therewith is a piston 6. Said piston comprises essentially a circular head portion 8 and a cylindrical skirt 10 depending from the peripheral edge of said head and formed integrally therewith. The piston is of somewhat smaller diameter than cylinder bore 4, in order to permit free operation of the piston in the cylinder, and to permit thermal expansion of the piston. Extending diametrically between opposite sides of skirt 10, intermediate the upper and lower edges thereof, is a wrist pin 12. The end portions of said wrist pin are carried for rotary pivotal movement in beaming bosses 14 formed integrally with skirt 10 and extending inwardly therefrom. Said beaming bosses are reinforced by ribs 16 formed integrally with the piston and extending from bosses 14 to piston head 8. These ribs serve to transmit the load exerted on the piston head to the wrist pin. Piston rod 18 extends upwardly through cylinder bore 4, and is formed at its upper end to present a head 20 mounted pivotally on wrist pin 12 intermediate bosses 14. Wrist pin 12 is prevented from moving longitudinally by snap rings 22 carried in bosses 14.

A plurality of piston rings are carried in grooves formed peripherally in the outer surfaces of head 8 and skirt 10. A pair of compression rings 24 are carried by head 8, being disposed in grooves 26 formed therefor in said head. Said rings are usually solid in cross-section, and split to provide resiliency whereby they expand against the walls of cylinder bore 4 as shown in Fig. 1. Grooves 26 are closed at their bottoms, in order that gasses entering said grooves cannot enter the interior of the piston. Just below the lower of rings 24, and substantially above wrist pin 12, a peripheral groove 28 is formed in the piston for receiving an oil ring 30, and a similar groove 32 is formed adjacent the lower edge of skirt 10 for receiving an oil ring 34.

Figure 4:
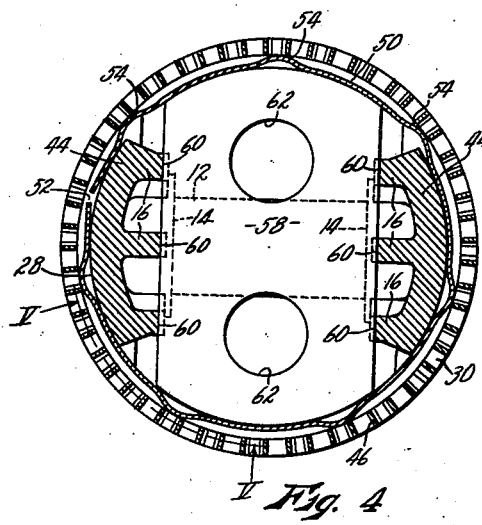
Figure 4 is a horizontal section taken on line IV—IV of Fig. 3.
Figure 3:
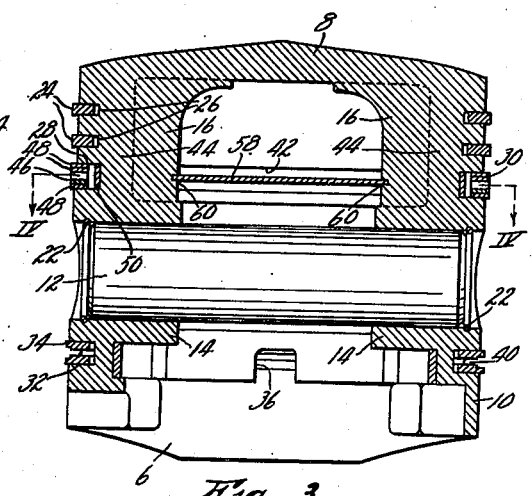
Figure 3 is a section taken on line III—III of Fig. 2.
Figure 5:
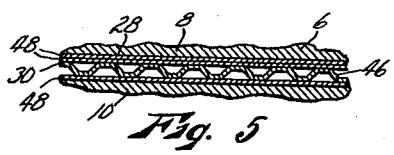
Figure 5 is a fragmentary section taken on line V—V of Fig. 4.

Skirt 10 has a plurality of apertures 36 and 38 formed therein and communicating with the bottom of groove 32. Oil ring 34 may be of any suitable type, that shown comprising a resilient split ring having slots 40 formed radially therethrough at spaced intervals, whereby oil scraped from the cylinder walls by said ring will flow through slots 40, and apertures 36 and 38 to the interior of the piston, and thence downwardly through the cylinder. The bottom wall of groove 28 is cut out around a major portion of its periphery, thereby forming slots 42 communicating with the interior of the piston. The only part of the skirt wall not cut away by slots 42 are those portions immediately adjacent ribs 16, said skirt wall portions and ribs forming diametrically opposite struts 44 connecting the head 8 to the skirt 10, as best shown in Figs. 3 and 4. As clearly shown in Fig. 4, struts 44 occupy only a minor portion of the periphery of the piston, thereby reducing the conduction of heat from the head to the skirt to a minimum.

Figure 6:
Figure 6 is an edge view of the piston ring spring.

Oil ring 30 occupying groove 28 is of the spring-loaded type, a representative ring of this type being shown in the drawing. It comprises a split corrugated spacer ring 46, and one or more flat split rings 48 disposed above and below said spacer ring, the number of component rings depending on the width of the groove to be filled. A flat leaf spring 50, best shown in Figs. 4 and 6, is disposed in the bottom of groove 28 and extends substantially therearound, being split as at 52. Said spring is of a width substantially equal to the width of groove 28, and is provided at intervals with outward offsets 54 adapted to contact the inner peripheral surface of oil ring 30 to urge said ring resiliently outwardly against the cylinder wall. As shown in Fig. 6, the edges of spring 50 are notched as at 56. The corrugations of spacer ring 46, notches 56 in spring 50, and slots 42 provide passageways through which oil scraped from the cylinder walls by ring 30 may flow to the interior of the piston.

Spring 50 is based on the bottom wall of groove 28 adjacent struts 44, but would be unsupported in the portions of said groove traversed by slots 42 unless special means were provided. The means provided for this purpose is a flat plate 58 disposed at right angles to the axis of the piston and in the plane of slots 42. As best shown in Fig. 4, said plate is elongated, having straight, parallel side edges and having its end edges arcuately curbed on a diameter equal the root diameter of groove 28. Said plate is movable transversely of the piston, the edge portions thereof being carried slidably in grooves 60 formed in the inner vertical edges of ribs 16. It is of course apparent that any convenient portion of the piston other than ribs 16 could be utilized for mounting plate 58. Thus plate 58 may be moved transversely to the axis of wrist pin. At its ends, said plate contacts the inner surface of spring 50 and serves as a foundation for supporting said spring. It will be noted that plate 58 is disposed substantially in the midplane of slots 42, and is substantially thinner than the width of said slot. Thus said plate does not obstruct said slots, nor interfere with their efficiency either as a means for permitting circulation of oil as means for reducing conduction of heat from the piston head. Plate 58 is provided with suitable apertures 62, which prevents the plate from interfering with the circulation of cooling oil against the inner surface of piston head 8. The number, size, and spacing of said apertures may be varied as desired.

The slidable mounting of plate 58 provides also that spring 50 has a foundation which "floats" relative to the piston on an axis transverse to the wrist pin. Thus when the explosions in the cylinder load the piston unevenly and force said piston to one side or the other of the bore along the axis of plate 58, said plate will slide in the piston, thereby avoiding undue pressure on the cylinder walls and greatly reducing scoring and uneven wear of the cylinder walls. Movement of the piston in a direction parallel to the axis of the wrist pin is resisted by its mounting on the piston rod, said piston rod being substantially rigid in a plane transverse to its pivotal plane.

It is not intended to be limited by the specific structure of the piston rings shown. The invention is adapted to be applied to any piston ring of the spring-loaded type wherein the ring is resiliently expanded by a spring carried in the ring groove. It is apparent that plate 58 could be provided as standard equipment in new pistons, or could be furnished as an accessory for use whenever it is desired to install rings of the spring loaded type. In the latter case only a minimum of alterations would be necessary. In the piston shown, the only alteration necessary is the formations of grooves 60 for supporting the plate.

Although I have shown a specific embodiment of my invention, it is apparent that many minor variations of construction and operations could be made without departing from the spirit of the invention.

What I claim as new and desire to protect by Letters Patent is:

1. In a piston for internal combustion engines of the class described having a hollow cylindrical skirt with a peripheral ring groove formed therein, said skirt being cut away at the base of said ring groove to form slots communicating with the interior of said skirt and extendng around the major portion of said skirt, a member carried by said piston and extending diametrically through said skirt, the ends of said member being disposed in said slots, a flat spring carried in said groove and having portions thereof based on said member, and a resiliently expansible piston ring carried in said groove and adapted to be urged outwardly by said spring.

2. In a piston for internal combustion engines of the class described having a hollow cylindrical skirt with a peripheral ring groove formed therein, said skirt being cut away at the base of said ring groove to form slots communicating with the interior of said skirt and extending around the major portion of said skirt, a member carried by said piston and extending diametrically through said skirt, the ends of said member being normally disposed at the base of said groove within said slots, and said member being slidable relative to said piston at right angles to the axis thereof, a flat spring disposed at the base of said groove and having the portions thereof transversing said slots contacting the ends of said member, and a resiliently expansible piston ring carried in said groove and adapted to be urged outwardly by said spring.

3. In a piston for internal combustion engines of the class described having a head, a hollow cylindrical skirt depending from said head, and a wrist pin extending diametrically between and carried by the walls of said skirt, said skirt having a peripheral ring groove formed in the external surface thereof adjacent said head, said skirt being cut away at the base of said groove at opposite sides of the piston to form slots communicating with the interior of said piston, the portions of said skirt between the ends of said slots forming struts for supporting said head, a planar elongated plate disposed at right angles to the axis of the piston and extending diametrically through said skirt with its ends disposed in said slots at the base of said groove, a flat spring carried in said groove and having portions thereof supported by the ends of said plate, and a resiliently expansible piston ring carried in said groove and adapted to be urged outwardly by said spring, said spring and said piston ring having apertures formed therein for the circulation of oil.

4. In a piston for internal combustion engines of the class described having a head, a hollow cylindrical skirt depending from said head, and a wrist pin extending diametrically between and carried by the walls of said skirt, said skirt having a peripheral ring groove formed in the external surface thereof adjacent said head, said skirt being cut away at the base of said groove at opposite sides of the piston to form slots communicating with the interior of said piston, the portions of said skirt between the ends of said slots forming struts for supporting said head, said struts being in the vertical plane of said wrist pin, a planar elongated plate carried by said piston, said plate being disposed horizontally and extending diametrically between the walls of said skirt at right angles to the axis of said wrist pin, the ends of said plate being disposed in said slots at the base of said groove, a flat spring carried in said groove with portions thereof supported by the ends of said plate, and a resiliently expansible piston ring carried in said groove and adapted to be urged outwardly by said spring, said spring and said piston ring having apertures formed therein for the circulation of oil.

5. In a piston for internal combustion engines of the class described having a head, a hollow cylindrical skirt depending from said head, and a wrist pin extending diametrically between and carried by the walls of said skirt, said skirt having a peripheral ring groove formed in the external surface thereof adjacent said head, said skirt being cut away at the base of said groove at opposite sides of the piston to form slots communicating with the interior of said piston, the portions of said skirt between the ends of said slots forming struts for supporting said head, said struts being in the vertical plane of said wrist pin, a planar elongated plate carried by said piston for sliding movement transverse to the axis of said wrist pin, said plate being disposed horizontally and extending diametrically through said skirt with its ends disposed normally in said slots at the base of said ring groove, a flat spring carried in said ring groove and having the portions thereof traversing said slots supported by the ends of said plate, and a resiliently expansible piston ring carried in said groove and adapted to be urged outwardly by said spring, said spring and said piston ring having apertures formed therein for the circulation of oil.

6. In a piston for internal combustion engines of the class described having a head, a hollow cylindrical skirt depending from said head, and a wrist pin extending diametrically between and carried by the walls of said skirt, said skirt having a peripheral ring groove formed in the external surface thereof adjacent said head, said skirt being cut away at the base of said groove at opposite sides of the piston to form slots communicating with the interior of said piston, the portions of said skirt between the ends of said slots forming struts for supporting said head, said struts being in the vertical plane of said wrist pin, a planar elongated plate carried by said piston for sliding movement transverse to the axis of said wrist pin, said plate being disposed horizontally and extending diametrically through said skirt with its ends disposed normally in said slots at the base of said ring groove, a flat spring carried in said ring groove and having the portions thereof traversing said slots supported by the ends of said plate, and a resiliently expansible piston ring carried in said groove and adapted to be urged outwardly by said spring, said spring and said piston ring having apertures formed therein for the circulation of oil, and said plate having apertures formed therein whereby oil may circulate against the inner surface of the piston head.

7. In a piston for internal combustion engines of the class described having a head, a hollow cylindrical skirt depending from said head, and a wrist pin extending diametrically between and carried by the walls of said skirt, said skirt having a peripheral ring groove formed in the external surface thereof adjacent said head, said skirt being cut away at the base of said groove at opposite sides of the piston to form slots communicating with the interior of said piston, the portions of said skirt between the ends of said slots forming struts for supporting said head, said struts being in the vertical plane of said wrist pin, a horizontally disposed planar elongated plate substantially thinner than the width of said ring groove carried by said piston substantially at the horizontal mid-plane of said groove, said plate extending through said skirt at right angles to said wrist pin and being carried for longitudinal sliding movement in grooves formed therefor in said struts, the ends of said plate being curved to a diameter equal to the root diameter of said ring groove and disposed in said slots, a flat spring disposed in said ring groove with the portions thereof traversing said slots supported by the ends of said plate, and a resiliently expansible piston ring carried in said ring groove and adapted to be urged outwardly by said spring, said plate having apertures formed therethrough whereby oil may circulate against the piston head, and said spring and said piston ring having apertures formed therethrough for the circulation of oil.

ROBERT E. SHARP.

No references cited.